June 4, 1974  JAMES C. FLETCHER  3,814,645
ADMINISTRATOR OF THE NATIONAL
AERONAUTICS AND SPACE ADMINISTRATION
METHOD OF REPAIRING DISCONTINUITY IN FIBERGLASS STRUCTURES
Filed May 9, 1972

United States Patent Office 3,814,645
Patented June 4, 1974

---

3,814,645
METHOD OF REPAIRING DISCONTINUITY IN FIBERGLASS STRUCTURES
James C. Fletcher, Administrator of the National Aeronautics and Space Administration, with respect to an invention of Leonard L. Gelb, Wilmington, Del., William B. Helbert, Jr., Radford, Va., Ronald B. Enie, State College, Pa., and Richard F. Mulliken, Yorktown, Va.
Filed May 9, 1972, Ser. No. 251,752
Int. Cl. B32b 35/00
U.S. Cl. 156—94                                        8 Claims

ABSTRACT OF THE DISCLOSURE

Damaged fiberglass structures are repaired by substantially filling the irregular surfaced damaged area with a liquid, self-curing resin, preferably an epoxy resin mixed with choped fiberglass, and then applying to the resin surface the first of several woven fiberglass swatches which has stitching in a zig-zag pattern parallel to each of its edges and a fringe of warp and fill glass fibers about the edges outward of the stitching, coating the applied swatch with the liquid, self-curing resin, and applying additional swatches in a similar manner, each of a larger dimension than the preceding swatch in a manner to overlap a portion of the fringe of adjacent swatches, until the fiberglass swatch and resin composite that is formed covers the area to be repaired, and allowing the resin to cure. The method is especially applicable to repair of fiberglass rocket engine casings and is particularly advantageous since it restores the repaired fiberglass structure to substantially its original strength without any significant changes in the geometry or mass of the structure.

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 U.S.C. 2457).

BACKGROUND OF THE INVENTION

This invention is concerned with the repair of fiberglass structures which are defective because of accidental damage or flaws during the course of manufacture or subsequent handling.

Up to the present time, the repair of such damage or flaws, for example, gouges, grooves, holes, and the like, in fiberglass structures in such manner as to restore or reinstate the integrity of the original structure has been difficult and met with limited success. Primary among the problems encountered is the fact that the original structure generally could not be restored to a condition wherein the physical properties such as tensile strength, compressive strength, shear strength, and the like were approximately that of the original undamaged structure. Furthermore, patching techniques utilized in the past which might restore appreciable amounts of the original structural strength caused gross changes in the original geometry and mass of the structure and proved impractical in many instances due to the nature of handling and repair equipment required for repair to be accomplished.

The capability of restoring a fiberglass structure to substantially its original strength and maintaining substantially the original geometry of the structure is particularly important in structures such as rocket engine casings, wherein fiberglass construction has been used extensively.

In U.S. 2,924,546, a damaged structure is repaired by wrapping the damaged area with a continuous strip of glass fiber cloth impregnated with a synthetic resin. Substantial changes in the geometry of the underlying structure are caused by this method of repair.

Another approach utilized steel filaments and filament wound unidirectional glass mat together with an elastomeric binder. This was found to be unsatisfactory in repairing rocket engine casings since the patches failed to hold when critical internal pressures were applied to the motor casings.

SUMMARY OF THE INVENTION

The present invention overcomes the foregoing problems in repairing damage to fiberglass structures. The present invention provides a relatively simple means for repairing fiberglass structures which maintains the structure in substantially its original geometry as well as restoring substantially all the desirable physical properties to the damaged area.

The present invention provides fiberglass cloth swatches having a construction which makes them particularly useful in the repair of the foregoing defects in fiberglass structures.

According to the present method, woven fiberglass cloth swatches are bonded to the fiberglass structure at the points of discontinuity in such a manner that stresses which would normally accumulate at the severed ends of glass filaments in the original structure are transmitted through the glass cloth of the swatch. This overcomes the problem encountered where a concentration of stresses at the defect site would normally result in the complete rupture of the fiberglass at relatively low stress levels. The patch effected according to the method of the present invention substantially reinstates all or most of the capability of the original fiberglass structure to a degree as if the unit were not damaged at all.

According to this invention, woven glass cloth threaded into rectangular plys of appropriate size, corresponding to the damaged area plus the bonding area around the perimeter of the damaged area, are bordered with a zig-zag stitch to prevent the cloth from unraveling during the bonding operation. Usually a cotton zig-zag stitch is utilized. Preferably the bonding area around the damaged area extends at least two inches from the periphery of the damaged area. Fibers are removed from the edges of each ply to the zig-zag stitching in such a manner as to create a fringe of approximately ¼ to ½ inch in length around the periphery of the cloth swatch. At least three such plys of cloth in increasing size are superimposed over the bond area bottom to top for proper nesting. Preferably in order to obtain the maximum tensile strength, the long sides of all plys are laid parallel to each other, that is, the warp should be oriented parallel to the highest load bearing direction of the cut fibers in the defective structure. Any simple woven cloth may be used provided that the strongest filaments lie in the warp direction. Typically isotropic glass cloth has been utilized for swatch material but structural considerations may sometimes require other weave configurations. An isotropic cloth is one that is woven with the same number of threads in both the warp and woof directions.

According to this invention, there is thus provided a method of patching a local discontinuity in the surface of a fiberglass body. The discontinuity generally has an irregular surface caused by the damage. The irregular surface is coated with a liquid room temperature self-curing resin. Typical resins which may be used are polyester resins such as maleic anhydride, polyol esters crosslinked with a vinyl monomer, and melamine formaldehyde condensates. Particularly preferred, however, are self-curing, at ambient (room) temperature, epoxy resins of the bisphenolepichlorohydrin type, which are mixed with flexiblizers based upon dibasic organic acids. Such flexibilizers comprise, for example, glycidyl esters of organic dibasic acids such as adipic acid and the like, and cycloaliphatic diepoxides based on such dibasic acids. An example of such a flexibilizer is bis (3,4-epoxy-6-methylcyclohexylmethyl) adipate. The resin composition also includes a hardener or curing agent, a catalyst for curing at room temperature and preferably a thixotropic agent. Examples of suitable catalyst are 2,4-dinitrophenol, benzyldimethylamine, and stannous octoate. Examples of hardener agents are isopropylmetaphenylenediamine, methylene dianiline, and hexahydrophthalic anhydride.

The flexibility of the epoxy resin system is generally characterized by a 50 to 100% elongation.

An example of a typical composition is one comprising 100 parts by weight of a mixture of 3 parts by weight of a bisphenolepichlorohydrin resin, 1 part of a flexibilizer and 3% by weight of a clay as a thixotropic agent; and 15 parts by weight of a hardener and catalyst mixture comprising a mixture of isopropylmetaphenylenediamine and methylene dianiline as hardener and 2,4-dinitrophenol as a catalyst. (EA 946 from the Dexter Corporation of Pittsburg, California).

The bonding surface adjacent to the defect area is prepared by sanding until the surface gloss is romeved, cleaning and removing any loose material and then coating with the liquid, self-curing resin. A mixture of the resin and from 0 to about 30% by weight chopped fiberglass is then applied to substantially fill the damaged area. A first smaller ply of the fringed glass cloth described above is placed in position on top of the resin-fiberglass mixture, and pressed down into position to impregnate the cloth with the resin, and remove air bubbles. The edges of the swatch are easily held in place since the fringe portions provide good adherence to the resin. The pressing procedure is typically accomplished by using a roller to provide a uniformity of pressure to the swatch application. After the first swatch is thus applied, additional resin is brushed on the top of the ply and the next larger ply is placed into position and pressed in place as the first. Overlapping fringes of the two plys provide a gradual transition and elevation between succeeding patches thus avoiding the formation of any bumps at the stitch sites to cause strain or provide a pocket for undesirable air entrainment in the resin. The fringes serve as bridges between the layers of cloth and the surface of the fiberglass body. This procedure is repeated until the composite of resin and progressively larger fiberglass swatches is progressively built-up on the original surface of the fiberglass structure. If desired, a final coating of resin can be brushed across the surface of the last swatch to form a smooth finishing coat on the surface of the patched fiberglass structure. As indicated above, the particularly preferred resin utilized in the method of this invention is one that has good tensile strength, high elongation and excellent adhesion to glass and readily expands and contracts with stresses in the structure without cracking or loosing its adhesive capability. Shear loads are thus distributed over the entire composite structure and transmitted to the glass fiber reinforcements of the swatches through the agency of the resin.

DESCRIPTION OF A PREFERRED EMBODIMENT

Figure 1:
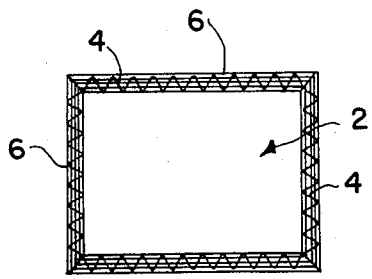
FIG. 1 is a plan view of a fiberglass swatch having zigzag stitching about its periphery.

Referring to the accompanying drawings in more detail, FIG. 1 shows a fiberglass cloth swatch 2 comprised of Owen-Cornings S–81–901 harness weave in the form of a rectangle. A zig-zag stitch 4 of cotton thread has been sewed about the margins 6 of the swatch 2 to prevent the swatch from unraveling during the bonding operation.

Figure 3:
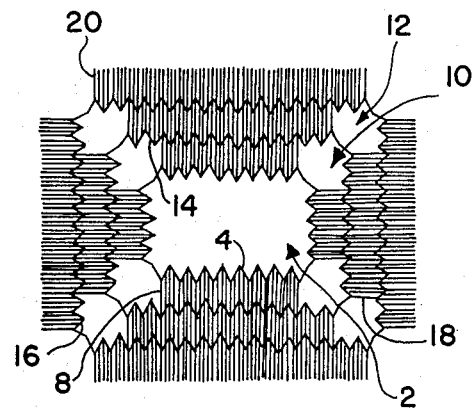
FIG. 3 is a plan view of fringed swatches as in FIG. 2 of progressively larger sizes superimposed one upon the other and overlapping.
Figure 2:
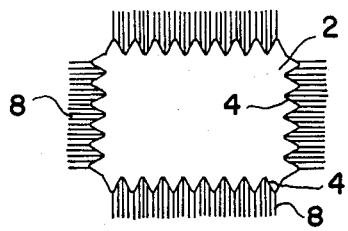
FIG. 2 is a plan view of the swatch of FIG. 1 which has been fringed about its periphery.
Figure 4:
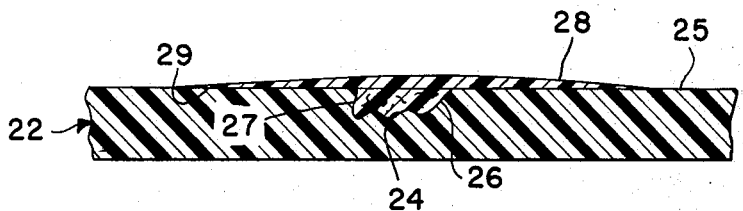
FIG. 4 is a cross section of a fiberglass structure showing a damaged area thereof which has been substantially filled with a liquid self-curing resin, containing chopped fiberglass and coated with a resin layer.
Figure 5:
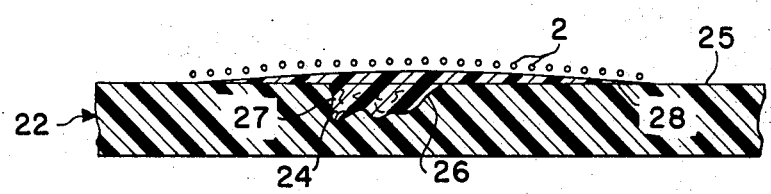
FIG. 5 is a cross section of the damaged fiberglass structure of FIG. 4 to which a single ply of fiberglass swatch of FIG. 2 has been added.
Figure 6:
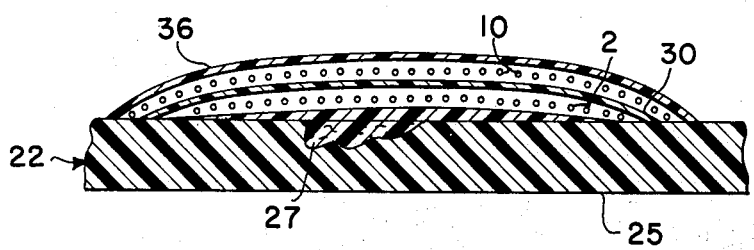
FIG. 6 is a cross section of the fiberglass structure of FIGS. 4 and 5 showing superimposed layers of fiberglass swatches.

In FIG. 2 warp and woof fibers have been removed from the edges of swatch 2 to form a fringe 8 about the periphery of the swatch as defined by the zig-zag stitching 4. The fringe is approximately ¼ to ½ inch in length. FIG. 3 shows three plys of fringed swatches similar to those of the type shown in FIG. 2 superimposed one upon the other and viewed upwardly as they would appear from the bottom of the defect to be repaired, that is, they are stacked with the first and smallest 2 at the bottom of the defect to be patched with the next larger size 10 placed on top of the first swatch and the third swatch 12 placed on top of the second swatch 10. The second swatch 10 has a zig-zag stitching 14 as described above and fringe 18. Similarly, the third swatch 12 has zig-zag stitching 16 and fringe 20. While in this embodiment, three successive plys or swatches are utilized, it is understood that, depending on the depth of the defect and the thickness of the individual plys, many more than three plys may be necessary or two may be sufficient. In order to acquire the desired degree of strength, at least two plys are necessary. The swatches are cut to appropriate size so that the portion of the fringed area of each overlaps that of the preceding ply so as to form a gradual transition and elevation from one ply of the patch to the next. In FIG. 4, a section 22 of a fiberglass rocket casing is shown with a gouge 24 in the surface 25 thereof. The gouge 24 has an irregular surface 26. To repair the gouge according to this invention, a bonding surface area 29 of at least two inches around the perimeter of gouge 24 is first sanded until the gloss has been removed to provide a good bonding surface thereby. Gouge 24 is substantially filled with the epoxy resin used and containing from 0–30% by weight of chopped fiberglass as a filler and as designated by reference numeral 27. An initial layer of fresh epoxy resin is applied with a brush on the sanded bonding surface to form a thin layer 28 as shown. A first ply of a glass cloth swatch 2, stitched and fringed as described above is placed in position over the adhesive layer 28 (FIG. 5) and pressed into position with fingers, followed by a suitable roller, to hasten the impregnation of the fiber and to remove any air bubbles. The edges of the swatch 2 are held in place by the fringe 8 which readily sticks to the layer of resin 28. A layer 30 of the epoxy resin is brushed on the top of the swatch 2 and next a larger swatch 10 is placed in position as the first and pressed firmly into position with fingers and roller as before (FIG. 6). This procedure is repeated as necessary until the composite structure is built-up slightly higher than the level of surface 25 of the casing 22 to provide the necessary strength to transfer the loads normally carried by the defected fibers. A final coating 36 of epoxy resin may be applied in order to give a smooth finished surface.

Practical experience in repair of damaged rocket engine casings utilizing the repair method of this invention has shown that the patches applied according to this invention reinstate the integrity of the casing and physical properties substantially equal to that of the original structure in the damaged area. In repairing damage in similar cases by prior art methods, it has been found that the casing would fail causing the engine to be destroyed due to chamber (casing) rupture.

The present invention provides a method of repairing damaged fiberglass structures utilizing special fiberglass swatches in a manner which restores the damaged structure to its original integrity without any significant change in the geometry of the structure. The zig-zag stitching of the periphery of each fiberglass swatch serves to prevent fraying and unraveling of the cloth and serves as a backstop for the fringe. The superimposed swatches wherein the fringes are overlapped provide a gradual transition and elevation between plys in the patch. The resin impregnated fringes reduce bumps by forming bridges between the layers of cloth and the surface of the fiberglass structure.

The patch design is based upon the "load to be transferred" by the repair patch. This load must be carried in shear through the bond layer and in tension by the fiberglass cloth. The number of plies of cloth required to repair a defect is dependent upon the load to be transferred." This load is equal to the load that would have normally been carried by the damaged fibers in the defect.

The number of plies required to carry the load in a given situation is highly dependent upon (1) the extent of fiberglass damage, considering both length and depth of the damaged area and if either the surface size or depth is not clearly accessible the fiberglass body is assumed to have lost all strength in the damaged area, (2) the orientation of the defect with respect to the winding pattern, (3) the magnitude and direction of loads normally carried by the fiberglass body, and (4) the strength of the fiberglass patching material.

Loading among the plies is normally non-uniform, being greatest in the ply nearest the fiberglass body or motor case and decreasing successively in the second and subsequent plies. It is apparent therefore that the design of a successful application of the patching process disclosed herein should be based on a stress analysis of the damaged area of the motor case in the normal, undamaged state and of the patch planned itself.

In a specific example of the patching technique described herein:

Subject repaired:
Rocket motor, filament wound fiberglass case Cylindrical section 18 inch diameter x 30 inch length;
Motor chamber pressure:
Maximum continuous—350 p.s.i. (ignition spike not considered)
Defect:
Completely through the cylindrical wall .1 inch wide x 7½ inch length
Orientation of defect: Parallel to the motor axis
Repair used:
4 ply patch
Materials:
(1) Glass cloth:
Selected from (a) S/81–901 and (b) S/81–904 Owens Corning Products
(2) Bonding adhesive:
Self-curing epoxy resin
EA 946, Epon 946 or equivalent
Physical properties of single ply specimen: (average of four plies)
Ultimate strength: 773 lb./linear inch
Modulus: $6.69 \times 10^{-5}$ p.s.i.
Loading rate 3/in./min./in. gage length Although the invention has been described relative to a particular embodiment thereof, there are obviously numerous variations and modifications readily apparent to those skilled in the art in the light of the above teachings. It is therefore to be understood that the invention may be practiced otherwise than as specifically described.

What is claimed is:

1. A method of patching a local discontinuity in the surface of a fiberglass body, said discontinuity having an irregular surface, comprising:
    (a) substantially filling the discontinuity with a liquid, ambient temperature, curing resin composition having from 0 to 30% weight of a chopped fiberglass filler therein;
    (b) coating an area surrounding the discontinuity with a liquid, ambient temperature, self-curing resin to provide a bonding surface;
    (c) applying to said resin coated bonding surface and over the filled discontinuity a first woven fiberglass swatch, said swatch having stitching in a zig-zag pattern parallel to each of its edges and a fringe of warp and fill glass fibers about the edges of said swatch and extending outwardly therefrom;
    (d) coating said applied swatch with said resin;
    (e) applying an additional swatch as defined in (c) having larger surface dimensions than the preceding swatch applied with a portion of the fringes of the additional swatch overlapping a portion of the fringes of the preceding swatch;
    (f) repeating steps (d) and (e) as necessary until the fiberglass swatch and resin composite that is formed when cured provides the strength necessary to transfer the loads that are normally carried by the damaged fiberglass; and
    (g) allowing said resin composite to cure to hardness.

2. A method as claimed in claim 1 wherein said resin is a bisphenolepichlorohydrin.

3. A method as claimed in claim 1 wherein said epoxy resin composition comprises a bisphenolepichlorohydrin resin, a glycidyl ester of a dibasic organic acid, and a thixotropic agent, a hardener, and a catalyst for said resin.

4. A method as claimed in claim 1 wherein said swatch is comprised of isotropic glass cloth.

5. The method of claim 1 further including the step of providing a bonding surface area about the periphery of said discontinuity by sanding an area at least two inches around the periphery of said discontinuity sufficiently to remove the gloss from that portion of said fiberglass body.

6. The method of claim 1 wherein the bonding surface area surrounding the discontinuity extends at least two inches around the periphery of the discontinuity.

7. The method of claim 6 wherein the bonding surface area described is sanded to remove the surface gloss prior to coating thereof with the resin.

8. A method as claimed in claim 1 wherein said fringe is from ¼ to ½ inch long.

References Cited
UNITED STATES PATENTS

| | | | |
|---|---|---|---|
| 2,795,523 | 6/1957 | Cobb et al. | 156—94 |
| 2,783,214 | 2/1957 | Homan | 156—94 |
| 3,470,048 | 9/1969 | Jones | 156—94 |
| 2,924,546 | 2/1960 | Shaw | 156—94 |
| 2,955,642 | 11/1960 | Stark | 156—94 |

CHARLES E. VAN HORN, Primary Examiner

F. FRISENDA, Jr., Assistant Examiner

U.S. Cl. X.R.

117—2 R; 156—98, 153, 212, 213, 278, 280; 264—36